United States Patent [19]

Watanabe et al.

[11] Patent Number: 5,178,659
[45] Date of Patent: Jan. 12, 1993

[54] METHOD OF AN APPARATUS FOR BEND-SHAPING A GLASS PLATE AND BENDING MOLD USED FOR THEM

[75] Inventors: Yoshihiro Watanabe, Yokohama; Kenji Maeda, Aichi, both of Japan

[73] Assignee: Asahi Glass Company, Ltd., Tokyo, Japan

[21] Appl. No.: 663,174

[22] Filed: Mar. 1, 1991

[30] Foreign Application Priority Data

Mar. 1, 1990 [JP] Japan .................................. 2-47139

[51] Int. Cl.⁵ ..................... C03B 23/027; C03B 23/03
[52] U.S. Cl. ...................................... 65/106; 65/107; 65/287; 65/291
[58] Field of Search .................. 65/106, 107, 290, 291, 65/273, 287

[56] References Cited

U.S. PATENT DOCUMENTS

| | | | |
|---|---|---|---|
| 2,330,349 | 9/1943 | Galey | 65/291 |
| 2,452,488 | 10/1948 | Paddock et al. | 65/273 |
| 4,229,201 | 10/1980 | Comperatore et al. | 65/287 |
| 4,804,397 | 2/1989 | Stas et al. | 65/107 |

FOREIGN PATENT DOCUMENTS

| | | |
|---|---|---|
| 338216 | 10/1989 | European Pat. Off. |
| 361263 | 4/1990 | European Pat. Off. |
| 2359795 | 2/1978 | France |

Primary Examiner—Joye L. Woodard
Attorney, Agent, or Firm—Oblon, Spivak, McClelland, Maier & Neustadt

[57] ABSTRACT

The method and the apparatus for bend-shaping a glass plate of the present invention a bending mold which includes a fixed split mold portion having a bend-shaping surface which corresponds to an intermediate curved portion of the glass plate and movable split mold portions each of which has a bend-shaping surface corresponding to the side portions of the glass plate having the predetermined shape and which are respectively placed at the sides of the fixed split mold portion so that the bend-shaping surfaces are movable around pivotal shafts for movement into alignment with the bend-shaping surface of the fixed split mold portion. The method includes a press-shaping step including heating the glass plate placed on the bending mold in a heating furnace and pressing from via an auxiliary pressing member the portion to be deeply bent of the glass plate while the glass plate is placed on the bending mold. The position of the pivotal shafts of the bending mold are positioned further from said fixed split mold portion than is said bend-shaping surface of said movable split mold portion, such that a moment of force at each of the pivotal shafts which acts on each of the movable split mold portions at the time of press-shaping prevents the bending mold from developing during press shaping.

4 Claims, 9 Drawing Sheets

METHOD OF AN APPARATUS FOR BEND-SHAPING A GLASS PLATE AND BENDING MOLD USED FOR THEM

BACKGROUND OF THE INVENTION

The present invention relates to a method of bend-shaping a glass plate in a heating furnace and an apparatus for bend-shaping the glass plate. More particularly, the present invention relates to an improved method of and apparatus for bend-shaping the glass plate suitably used for deeply bending a side portion of the glass plate.

Generally, a laminated glass is formed by laminating two glass plates and an intermediate plastic film such as polyvinyl butyral as an interlayer, and it is widely used particularly for a windshield for an automobile from the standpoint of safety.

In such laminated glass of this kind, it is necessary to bend two flat glass plates to thereby form a laminated glass because there is a demand for the laminated glass having a curved surface from the viewpoint of excellent design for automobiles. In this case, when the glass plates are separately bent, a subtle difference in the shape of curve appears between the glass plates to be laminated. Accordingly, when they are laminated with the intermediate layer interposed therebetween, there results disadvantages such as that a complete joint between the two glass plates and the interlayer is not obtainable, or air bubbles are left at the surfaces of bonding when manufactured or in use, this causing the peeling-off of the laminated glass. Accordingly, a method of bending simultaneously two overlapping glass plates has been used for manufacturing the laminated glass.

As a conventional method of bend-shaping glass plates for a laminated glass, there has been known such a method that a bending mold having a bend-shaping surface corresponding to a curved surface of the laminated glass is prepared; two glass plates are placed on the bending mold in an overlapping state; the bending mold is transferred into a heating furnace together with the glass plates; the glass plates are heated to a temperature capable of softening glass so that the glass plates are bent by their own deadweight as the glass plates are softened, whereby the glass plates are bent so as to correspond to the bend-shaping surface of the bending mold (Japanese Examined Patent Publication No. 10332/1974).

In such method, when it is necessary to bend deeply a side portion of the laminated glass, there is used a bending mold having a fixed split mold portion in a ring form which has a bend-shaping surface corresponding to an intermediate curved portion of the laminated glass and a movable split mold portion in a ring form which is placed at a side (or both sides) of the fixed split mold portion so that it can move to the fixed mold portion so as to be in alignment with the fixed mold portion by its own deadweight, and which has a bend-shaping surface corresponding to a portion to be deeply bent of a side portion of the laminated glass. Two glass plates in a flat form are placed in an overlapping state on the bending mold with the movable split mold portion (portions) so that the movable split mold portion is developed; the bending mold is transferred into a heating furnace along with the glass plates; the glass plates are heated; and as the glass plates are softened, the movable split mold portion is moved so as to come into alignment with the fixed mold portion, whereby the side portion of the glass plates is deeply bent by their deadweight by means of the movable split mold portion.

In the conventional method of bend-shaping the glass plates for a laminated glass and when the both side portions of the overlapping glass plates are to be deeply bent, the side portions of the overlapping glass plates are forcibly bent-shaped by means of the movable split mold portions which are moved by the own deadweight of the glass plates. However, when the side portions of the overlapping glass plates are to be further deeply bent, the following disadvantage results. Namely, although the peripheral portion of the deeply bent portions of the glass plates can follow the shape of the bend-shaping surfaces of the movable split mold portions, the softened glass plates can not follow a desired radius of curvature of the curved surface excluding the peripheral portion of the deeply bent portions of the overlapping glass plates. Accordingly, the shaping operation for the deeply bent portions of the overlapping glass plates is insufficient. There is an attempt to heat locally the portions to be deeply bent of the glass plates to thereby make the bending operation easy. However, such method is still insufficient.

In order to solve the above-mentioned problem, it is considered to use a pressing method wherein the glass plates are interposed between a convex mold and a concave mold so that a correct curved shape of the glass plates is obtainable. In this method, however, the overlapping glass plates have to be simultaneously bend-shaped. Accordingly, it is necessary to correctly place the two overlapping glass plates and to hold them at the time of bend-shaping. However, when the two overlapping glass plates are to be held by using known techniques such as a hanging method or a sucking method, it is still insufficient to correctly position the overlapping glass plates, and as a result, the above-mentioned pressing method can not be used.

FIG. 13 shows an example of a split type bending mold 110 adapted to bend-shape two overlapping glass plates by utilizing the deadweight of the glass plates. The bending mold 110 is mounted on a base truck 126 which constitutes a transferring means. The bending mold 110 comprises a ring-like fixed split mold portion 111 having a bend-shaping surface 111a corresponding to the intermediate curved portion excluding both side portions of the overlapping glass plates 101 which are to be subjected to a deeply bending operation, and ring-like movable split mold portions 112 each having a bend-shaping surface 112a corresponding to a portion to be deeply bent of the glass plates 101 which are to be formed into a laminated glass plate 101, the bend-shaping surface 112a coming in alignment with the bend-shaping surface 111a of the fixed split mold portion 111 when the movable split mold portions 112 are moved to a set position at both sides of the fixed split mold portion 111. The fixed split mold portion 111 is fixed onto the base truck 126 by means of supporting bars 113, and both side portions in the width direction of each of the movable split mold portions 112 are respectively supported at the free ends of the supporting bars 115 provided on fixed brackets 114 of the base truck 126 so as to be swingable. Further, a balance weight 117 is attached to the supporting portion of each of the movable split mold portions 112 by means of a moment arm so as to be moved to the set position whereby the movable split mold portions 112 are in alignment with the fixed split mold portion 111.

FIG. 13a shows the bending mold on which two flat glass plates are placed in an overlapping state before they are subjected to the heating operation. FIG. 13b shows that the bending operation for the glass plates has been finished. FIG. 13c is a plan view for illustrating a state that the bending mold is split. The bending mold assumes a position that the movable split mold portions are in alignment with the fixed split mold portion before the flat glass plates are placed on the bending mold. However, when the flat glass plates are placed on the bending mold, the movable split mold portions are automatically split due to the deadweight of the glass plates, whereby the bending mold assumes the state as shown in FIG. 13a. The construction of the movable split mold portions may be changed in design as desired so long as they can move in the direction capable of aligning with the fixed split mold portion due to the deadweight of the glass plates and to stop at the position in alignment with the fixed split mold portion. The direction of the movable split mold portions to the original set position can be adjusted by using some structural elements of the movable split mold portions or weights.

In case of press-shaping the glass plates on the split type bending mold by using an auxiliary pressing member so as to deeply bend portions of the glass plates from the upper direction, there sometimes takes place a phenomenon that a portion of the movable split mold portions which is close to the fixed split mold portion jumps up, this causing the deformation of a local portion of the glass plates. FIG. 3 is a diagram showing the above-mentioned phenomenon.

In FIG. 3, a reference numeral 1 designates a working surface of pressing load, a numeral 2 designates the bending mold and a numeral 3 designates a pivotal shaft for a movable split mold portion. In such typical bending mold, a moment of force resulting around the pivotal shaft applied to the movable split mold portion due to a pressing load functions to separate the bend-shaping surface of the movable split mold portion away from the bend-shaping surface of the fixed split mold portion, whereby there results the jumping phenomenon as described above.

In order to solve the above-mentioned problem, the following method has been proposed. Namely, the glass plates are bent by their deadweight on a so-called split type bending mold comprising movable split mold portions and a fixed split mold portion; side portions of the glass plates which are to be deeply bent are pressed by auxiliary pressing members from the upper direction of the glass plates while the movable split mold portions are clamped with respect to the fixed split mold portion, whereby the deeply bent portions are provided. The clamping operation is conducted to prevent the movable split mold portions from opening when the pressing operation is carried out. In order to assure a sufficient clamping function, it is necessary to support the movable split mold portions by raising them at the outside of the each of the pivotal shafts with respect to the fixed split mold portion, and to exert a force so that the bend-shaping surface of the movable split mold portions comes in alignment with the bend-shaping surface of the fixed mold portion inwardly from each of pivotal shafts with respect to the bend-shaping surface of each of the movable split mold portions.

FIG. 2 is a side view showing an example of the bending mold having the above-mentioned clamping structure, wherein a reference numeral 4 designates a weight clamping jig, a numeral 5 designates a pushing rod clamping jig, a numeral 6 designates a pushing rod, a numeral 10 designates a hinge, a numeral 13 designates an auxiliary pressing member, a numeral 1115 designates a weight, a numeral 16 designates a bending mold and a numeral 17 designates a glass.

However, the above-mentioned supporting structure using pushing means has difficulty in the adjustment of the height of the pushing rod 6 for each bending mold because the pushing operation has to be carried out from the outside of the heating furnace in order to avoid the disadvantage that a driving section is exposed in the high temperature of the heating furnace, and there often results local deformation at the portion of the laminated glass plate corresponding to the border portions between the movable split mold portions and the fixed split mold portion.

SUMMARY OF THE INVENTION

It is an object of the present invention to eliminate the disadvantages of the conventional method and apparatus for bend-shaping glass plates.

In accordance with the present invention, there is provided a method of bend-shaping a glass plate comprising a step of placing a glass plate on a bending mold to form the glass plate having at least one side portion which is deeply bent into a predetermined curved shape, said bending mold comprising a fixed split mold portion having a bend-shaping surface which corresponds to an intermediate curved portion of the glass plate and at least one movable split mold portion which has a bend-shaping surface corresponding to said side portion of the glass plate having the predetermined shape and which is placed at a side of said fixed split mold portion so that said bend-shaping surface is movable around a pivotal shaft and to the direction in alignment with the bend-shaping surface of said fixed split mold portion, provisional shaping step heating the glass plate to a temperature capable of bending the glass plate in a heating furnace to thereby bend it by its own deadweight so as to substantially meet the shaping surface of said bending mold, and a press-shaping step pressing from the upper direction by means of an auxiliary pressing member the portion to be deeply bent of said glass plate, wherein the position of said pivotal shaft of the bending mold is determined so that a moment of force around the pivotal shaft which acts on the movable split mold portion at the time of press-shaping prevents the bending mold from developing, i.e., from moving out of alignment.

Further, in accordance with the present invention, there is provided a method of bend-shaping a glass plate comprising a step of placing a glass plate on a bending mold to form the glass plate having at least one side portion which is deeply bent into a predetermined curved shape, said bending mold comprising a fixed split mold portion having a bend-shaping surface which corresponds to an intermediate curved portion of the glass plate and at least one movable split mold portion which has a bend-shaping surface corresponding to said side portion of the glass plate having the predetermined shape and which is placed at a side of said fixed split mold portion so that said bend-shaping surface is movable around the pivotal shaft and to the direction in alignment with the bend-shaping surface of said fixed split mold portion, provisional shaping step heating the glass plate to a temperature capable of bending the glass plate in a heating furnace to thereby bend it by its own deadweight so as to substantially meet the shaping surface of said bending mold, and a press-shaping step pressing from the upper direction by means of an auxiliary pressing member the portion to be deeply bent of said glass plate such that a moment of force around the pivotal shaft which acts on the movable split mold portion at the time of press-shaping prevents the bending mold from developing.

Further, in the method of bend-shaping the glass plates described just above, the movable split mold portion is forcibly opened by the application of a force onto the movable split mold portion of the bending mold when the glass plate is placed on the bending mold.

Further, in accordance with the present invention, there is provided an apparatus for bend-shaping a glass plate into a predetermined shape wherein a side portion of the glass plate is deeply bent which comprises; a bending mold comprising a fixed split mold portion having a bend-shaping surface which corresponds to an intermediate curved portion of the glass plate and at least one movable split mold portion which has a bend-shaping surface corresponding to said side portion of the glass plate having the predetermined shape and which is placed at a side of said fixed split mold portion so that said bend-shaping surface is movable around a pivotal shaft and to the direction in alignment with the bend-shaping surface of said fixed split mold portion, wherein the position of said pivotal shaft of the bending mold is determined so that a moment of force at the pivotal shaft which acts on the movable split mold portion at the time of press-shaping prevents the bending mold from developing, and an auxiliary pressing member placed to be vertically movable above the portion of said bending mold where the glass plate to be deeply bent is placed.

Further, in the apparatus for bend-shaping the glass plate described above, the movable split mold portion is forcibly opened by the application of a force onto the movable split mold portion of the bending mold when the glass plate is placed on the bending mold.

Further, in accordance with the present invention, there is provided a bending mold to receive thereon a glass plate and to bend-shape by heating the glass plate into a predetermined shape, which comprises; a fixed split mold portion having a bend-shaping surface which corresponds to an intermediate curved portion of the glass plate and at least one movable split mold portion which has a bend-shaping surface corresponding to said side portion of the glass plate having the predetermined shape and which is placed at a side of said fixed split mold portion so that said bend-shaping surface is movable around the pivotal shaft and to the direction in alignment with the bend-shaping surface of said fixed split mold portion, wherein said pivotal shaft is located outside the side portion of said movable split mold portion in a case that the bending mold is viewed from the upper direction.

As described above, in accordance with the technique by the present invention, the glass plates placed on the split type bending mold provided with the movable split mold portion and the fixed split mold portion are heated to a glass softening temperature at the heating-bending stage in the heating/bending furnace and are provisionally shaped into a shape which substantially corresponds to the bending mold. Then, an incompletely shaped portion in the provisionally shaped glass plates, specifically, the portion to be deeply bent of the glass plates is locally subjected to press-shaping so as to correspond to the deeply bending portion of the bending mold at the pressing stage which is located in rear of the heating/bending stage in the heating/bending furnace.

In the method of and apparatus for bend-shaping a glass plate according to the present invention, the design of the heating-bending furnace to bend-shape the glass plate may be changed as desired so long as it includes a heating-bending stage in which two overlapping glass plates to be bend-shaped are heated to a glass softening temperature and a pressing stage in which a side portion of the softened glass plates is subjected to a deep-bending operation by means of an auxiliary pressing member. In this case, it is preferable that the side portion of the glass plate to be deeply bent is heated at a higher temperature than the other portion of it at the heating-bending stage from the viewpoint that good processability is obtainable. In order to heat a local portion of the glass plate, it is preferable to arrange a local heater near the upper or lower side, or the both sides of the glass plate to be deeply bent. A transferring means to transfer the glass plate may be such as to move a base truck along a predetermined circulating passage or linear passage or may be a continuous conveyor such as transferring rollers, a transferring belt having heat resisting property or the like, as far as such means can transfer the bending mold in the heating-bending furnace. In this case, it is preferable that the transferring means is provided with a mechanically position-determining means, or the position of the transferring means, can be controlled by using a control system because it is necessary to correctly determine positional relationship between the bending mold and the auxiliary pressing means with an auxiliary pressing member in the pressing stage.

The design of the auxiliary pressing means may be changed as desired so long as it can exert a pressing force to a side portion of the glass plate to be deeply bent from the direction substantially perpendicular to the bend-shaping surface corresponding to the intermediate curved portion of the glass plate on the bending mold which is at a predetermined set position of the pressing stage, without causing any interference with the bending mold. Further, it is preferable that the auxiliary pressing member is located at a suitable position above the bending mold in the pressing stage from the viewpoint that a correct positional relation of the pressing member to the bending mold can be easily determined and in consideration of thermal efficiency in the heating stage and the durability of the auxiliary pressing member supporting means. The auxiliary pressing member may be of a pipe-like shape or may be formed corresponding to the entirety of the portion to be deeply bent of the glass plate. However, it is sufficient to form it so as to correspond to the portion having a small radius of curvature of the glass plate which is relatively difficult to obtain a complete shape only in the heating-bending stage. Further, when the glass plate is bent into a shape wherein the radius of curvature of the deeply bent portion is different at some parts, an auxiliary pressing member having the pressing surface in which there are different radii of curvature corresponding to the portions to be bent, is used.

DETAILED DESCRIPTION OF THE PREFERRED EMBODIMENTS

Preferred embodiments of the present invention will be described with reference to the drawings.

Figure 1A:
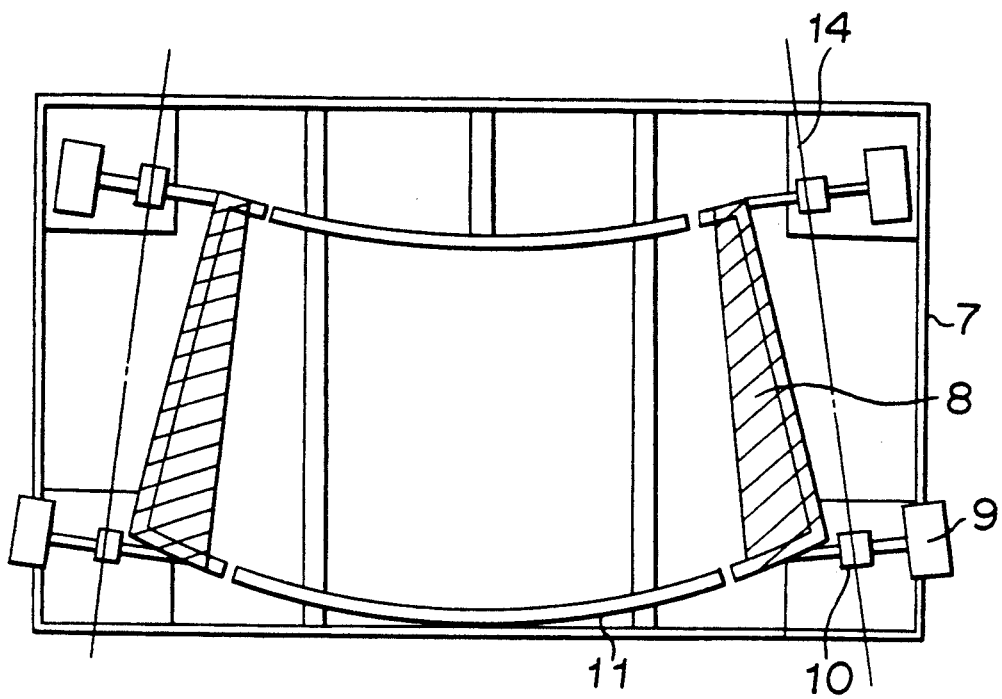
FIGS. 1a and 1b are respectively a plan and a side view of an embodiment of the bending mold suitably used for carrying out the method of or apparatus for bend-shaping a glass plate according to the present invention.
Figure 1B:
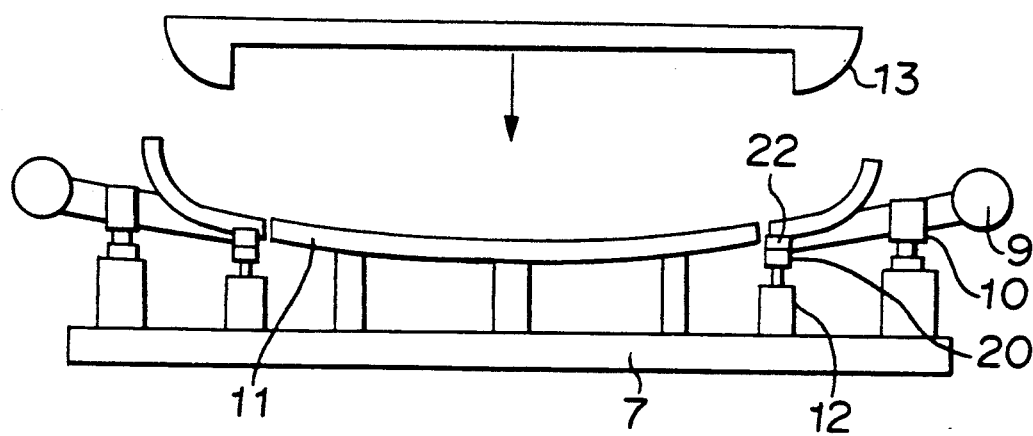
Figure 2:
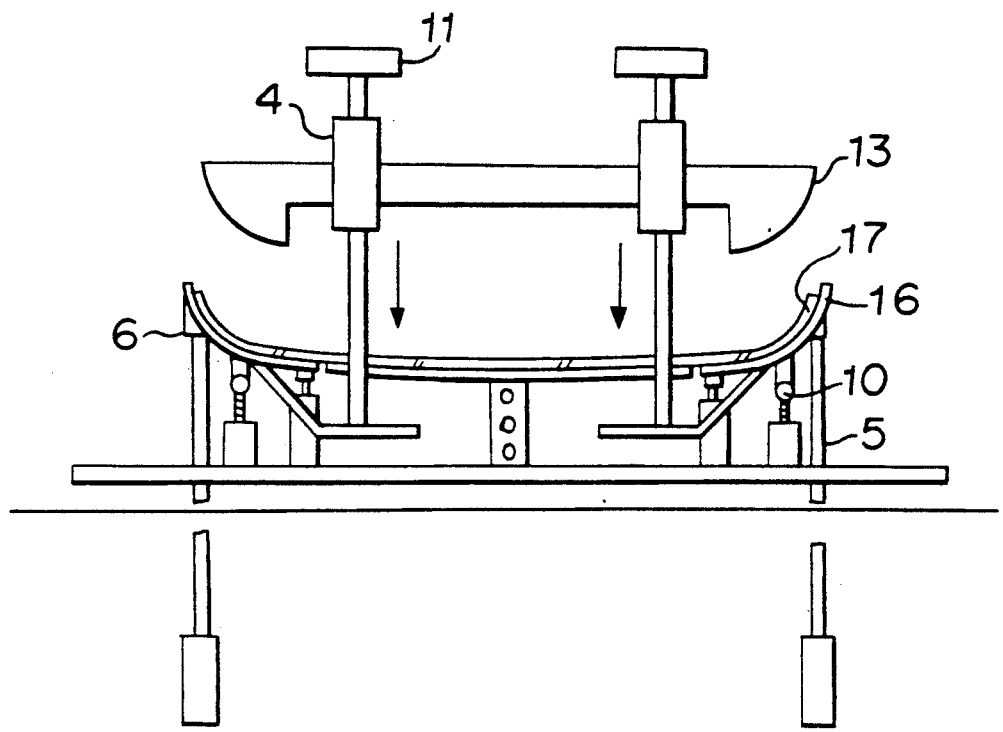
FIG. 2 is a side view of a conventional bending mold.
Figure 3:
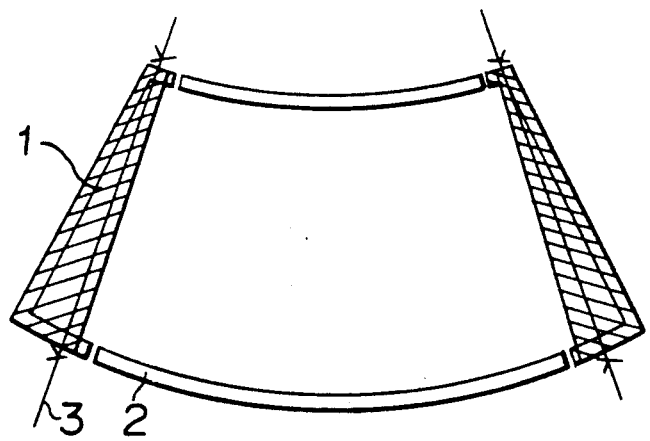
FIG. 3 is a diagram showing a phenomenon of the jumping of the movable split mold portion in the conventional bending mold.

FIGS. 1a and 1b are respectively a plan view and a side view showing an embodiment of the bending mold of the present invention and a desired positional relation of the bending mold to the auxiliary pressing member wherein a reference numeral 11 designates the bending mold, a numeral 13 designates an auxiliary pressing member and a numeral 7 designates a base truck for mounting the bending mold.

The bending mold used for the method of the present invention is so constructed that when glass plates are placed on the bending mold and they are pressed from the upper direction by means of the auxiliary pressing member 13, a moment of force results around the pivotal shaft 14, which acts on the movable split mold portion and prevents the bending mold 11 from developing. More specifically, the action of the moment of force to the movable split mold portion is produced by adjusting the action of a pressing load by the auxiliary pressing member and the pivotal shaft 14, i.e. the position of a hinge 10 which causes the revolution of the movable split mold portion around the pivotal shaft 14.

In particular, as shown in FIG. 1, the pressing surface 8 to the movable split mold portion is always inside the pivotal shaft 14 on the bending mold by positioning the pivotal shaft 14 at the outside of the movable split mold portion when the bending mold is viewed from the upper direction. That is, pivotal shaft 14 is positioned further from the fixed split mold portion 11 than is the bend shaping surface 8. Then, when the glass plates are press-shaped, a force is preferably applied to the bend-shaping surface of the movable split mold portion so as to move it in the direction in alignment with the bend-shaping surface of the fixed split mold portion irrespective of the action of the pressing load by the auxiliary pressing member 13. In this embodiment, since the hinge 10 is positioned outside the press-working surface 8 on the bending mold, a glass-bending moment can be adjusted by attaching a counter weight 9 at a position further outside the pivotal shaft 14.

A stopper 12 is provided so as to receive an engaging portion 22 of the movable split mold portion at a position where the bend-shaping surface of the movable split mold portion is in alignment with the bend-shaping surface of the fixed split mold portion as shown in FIG. 1b. The stopper 12 preferably has a shoulder portion 20 which is constituted by a bolt which allows the adjustment of the height. The stopper 12 prevents the movement of the movable split mold portion so that the bend-shaping surface of it does not move beyond the position where the bend-shaping surface of the movable split mold portion is in alignment with the bend-shaping surface of the fixed split mold portion.

Description will be made as to a method of bend-shaping the glass plates by their own deadweight and an apparatus for carrying out the method in which the above-mentioned bending mold is used.

FIG. 14 is a schematically illustrated side view showing the method of and apparatus for bend-shaping the glass plates.

Figure 14A:
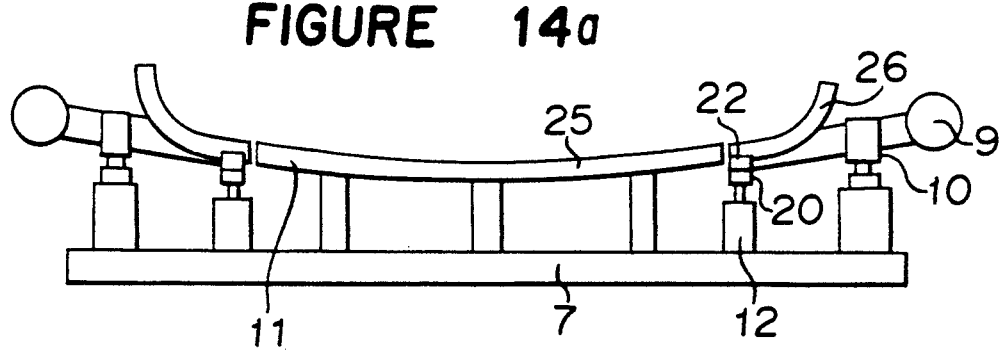
FIGS. 14a to 14d are respectively diagrams showing a deadweight shaping operation for a glass plate according to the present invention.
Figure 14B:
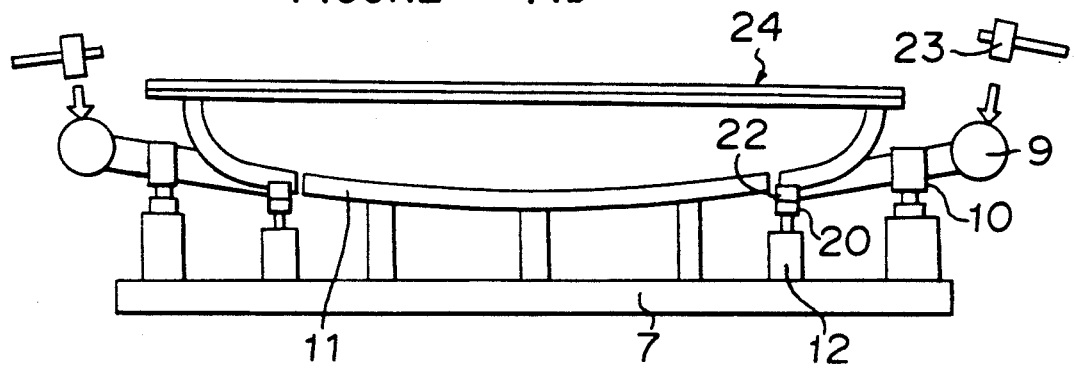
Figure 14C:
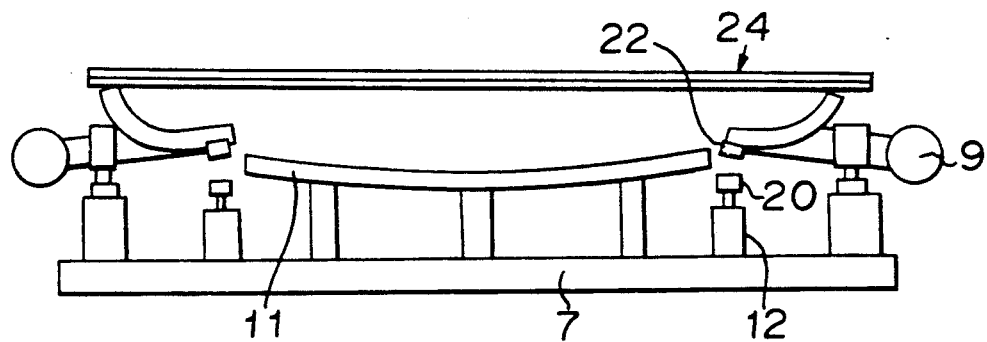
Figure 14D:
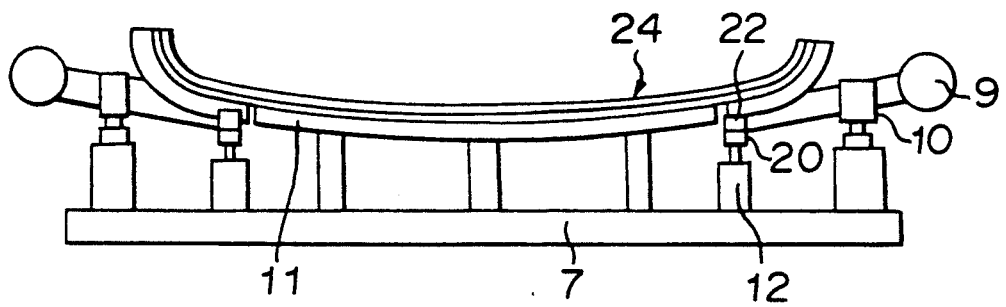

In a state that flat glass plates are not placed on the bending mold, the shaping surface of the movable split mold portion 26 of the bending mold is in alignment with the shaping surface of the fixed split mold portion 25 (FIG. 14a). Since the bending mold of the present invention is so constructed that the bending mold is not easily split even when a force is applied to the movable split mold portion from the upper direction, the bending mold does not usually split even by placing the flat glass plates 24 on the bending mold. Accordingly, it is desirable to forcibly split the bending mold by the application of a force to the movable split mold portion 26 by means of a forcing means 23. The forceable splitting of the bending mold may be carried out before or after the placing of the glass plates 24 on the bending mold (FIG. 14b). When the glass plates are placed on the bending mold in the splitting state, it maintains the splitting state due to the frictional force between the glass plates and the bending mold and the rigidity of the glass plates (FIG. 14c). When the glass plates 24 are softened by heating, the movable split mold portion 26 gradually moves resulting in the state that the shaping surface of the movable split mold portion 26 is in alignment with the shaping surface of the fixed split mold portion 25 because the bending mold is originally balanced for the state that the shaping surface of the movable split mold portion is in alignment with the shaping surface of the fixed split mold portion 25.

The forcing means 23 may be of any member so long as the application of a force to the movable split mold portion 26 forcibly splits the bending mold. For instance, the bending mold can be easily split by adding a force to the counter weight attached to the movable split mold portion 26 by means of a hammer made of rubber.

In the present invention, by pressing the glass plates, the moment of force is applied to the movable split mold portion so that the movable split mold portion is pushed to the stopper 12 whereby the movable split mold portion is automatically clamped to the fixed split mold portion without using a conventional clamping structure which is insufficient with respect to the above-mentioned problem.

Although the present invention is very effective in bending simultaneously two overlapping glass plates as is clear from the description described above, the present invention is not always limited to the use of two glass plates, but it is effective in bending a single glass plate.

In the following, description will be made as to a case that two glass plates are simultaneously bend-shaped.

EXAMPLE

Preferred Examples of the method of bend-shaping glass plates for a laminated glass and the apparatus for carrying out the method of the present invention will be described in detail with reference to the drawings.

Figure 4:
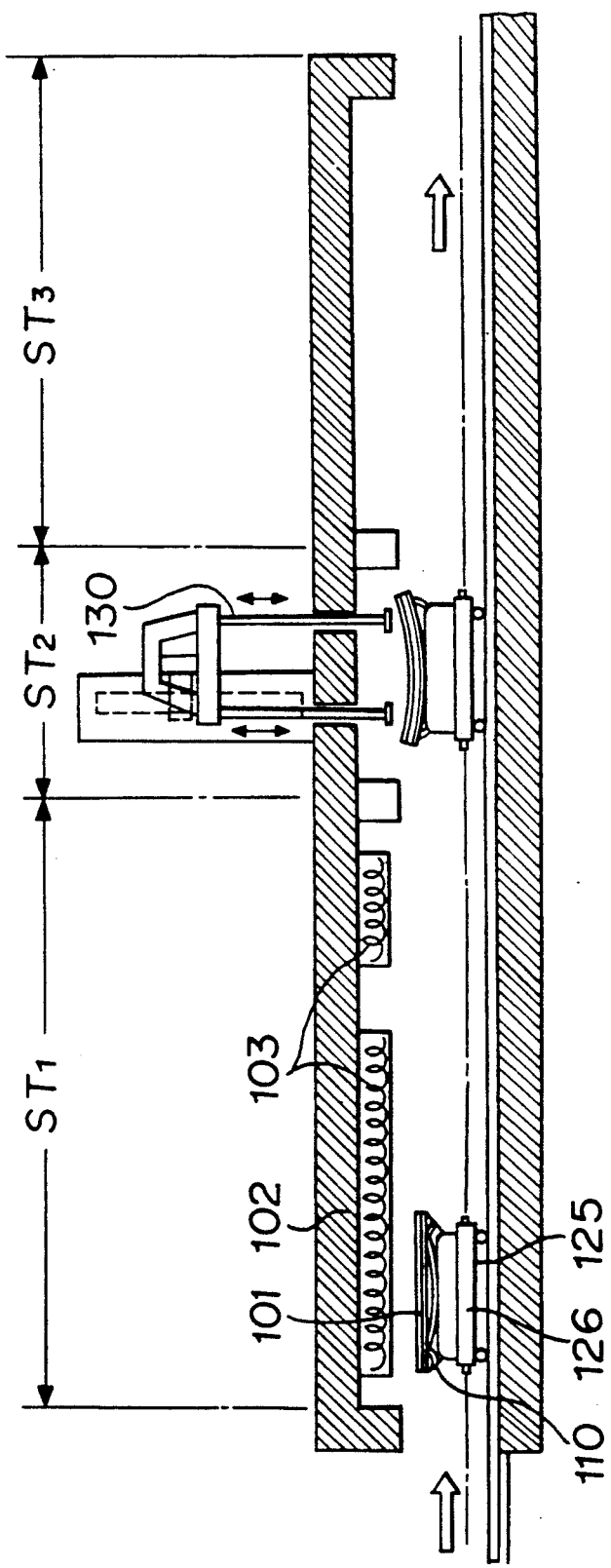
FIG. 4 is a diagram showing two overlapping glass plate bend-shaping system in which an embodiment of the apparatus for bend-shaping glass plates of the present invention is used.

FIG. 4 is a schematic diagram showing a system of bend-shaping glass plates for a laminated glass in which the method and the apparatus for deeply bend-shaping both side portions of the glass plates for a laminated glass according to the present invention, are utilized.

In FIG. 4, two overlapping glass plates for a laminated glass are placed on a bending mold 110. The overlapping glass plates together with the bending mold 110 are passed through the heating/bending stage ST1 and the pressing stage ST2 in a heating/bending furnace 102 and the cooling stage ST3 outside the heating-/bending furnace 102 by means of a transferring means 125 constituted by a base truck 126 which is moved by a chain conveyor (not shown). At the heating/bending stage ST1, the glass plates 101 are heated by heaters 103 in the heating furnace 102 to a glass softening temperature (550° C.-650° C.). The glass plates 101 are softened and provisionally shaped so as to correspond to the shaping surface of the bending mold 110 by their own deadweight. At the pressing stage ST2, an incompletely shaped portion corresponding to the deeply bent portion of the glass plates 101 are locally press-shaped by an auxiliary pressing means 130. At the cooling stage ST3, the press-shaped glass plates 101 are gradually cooled on the bending mold 110 while the bending mold is moved at a controlled cooling speed for a predetermined time so as to avoid an undesired distortion. Then, the two overlapping glass plates 101 shaped and transferred from the cooling stage ST3 are allowed to cool.

The deadweight type bending mold on which two glass plates are placed is preferably of a type having a bend-shaping surface which corresponds to an intermediate curved portion of the glass plates to be shaped and which is formed of a heat resisting material durable to the shaping temperature (580° C.-700° C.) to the glass plates in the heating/bending furnace. The bending mold may have such construction as having a surface corresponding to the glass plates having a predetermined curved portion, or having a ring shape which is capable of supporting the periphery of the glass plates. Between the above-mentioned two types, the ring-shaped type bending mold is preferably used because it satisfies a demand that a contacting area between the surface of the glass plates and the bending mold is minimized so that the surfaces of the glass plates are kept smooth. In the present invention, the bending mold as shown in FIG. 1 is most preferably used. In order to avoid deformation of the bending mold because of a pressing force, it is preferable that the structure around the hinge is rigid, and specifically, the diameter of the core rod of the hinge should be at least 20 mm.

The bending mold of the present invention has the construction difficult to develop even when a force is applied to the movable split mold portions from the upper direction. Accordingly, when the glass plates are to be placed on the bending mold, it is preferable to apply a force to the movable split mold portions by a hammer of rubber or the like to thereby forcibly split the bending molds. Then, the bending mold maintains a splitting state due to a frictional force between the glass plates and the bending mold and the rigidity of the glass plates.

Figure 12:
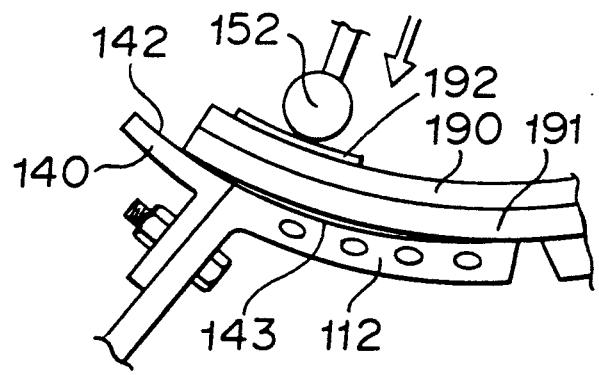
Figure 13A:
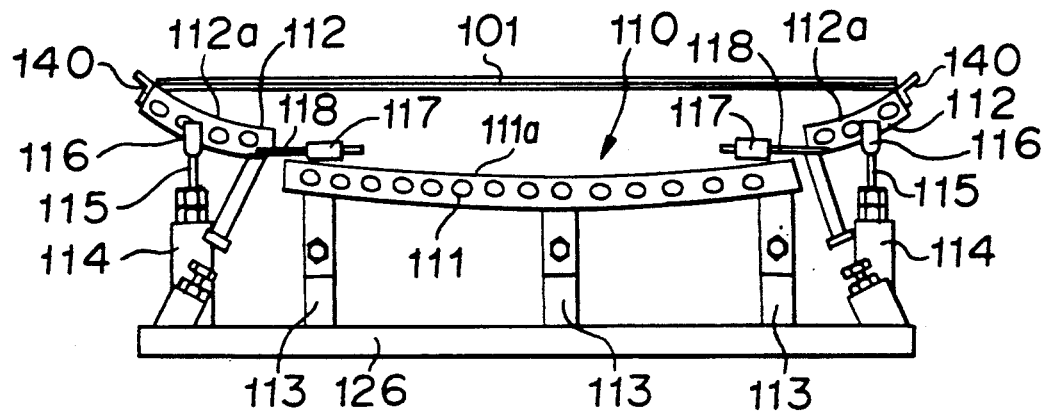
FIGS. 13a, 13b and 13c are respectively side views and a plan view showing an embodiment of the bending mold according to the present invention.
Figure 13B:
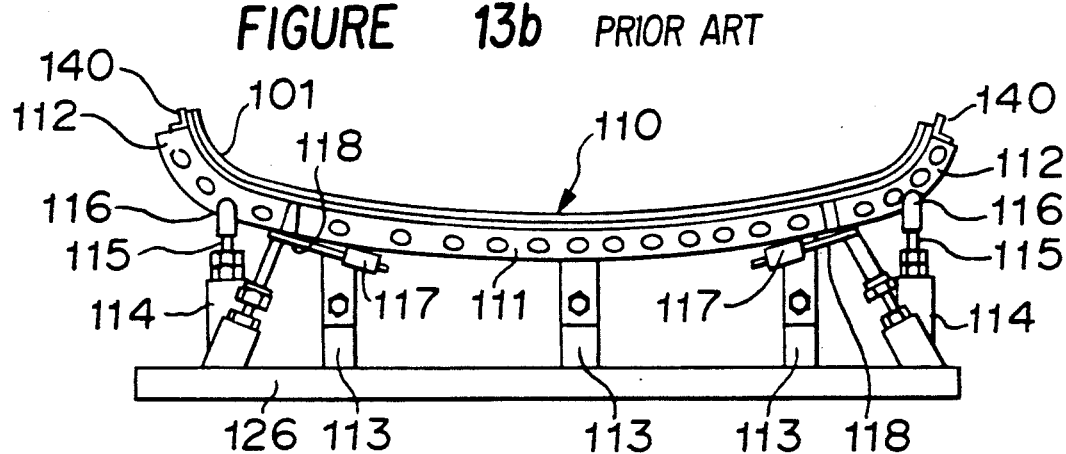
Figure 13C:
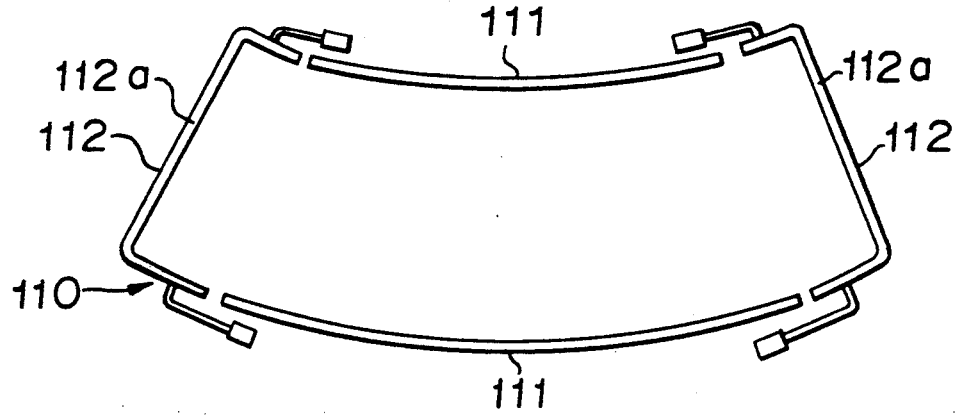

It is preferable to provide a taper ring 140 having a taper angle corresponding to a curved shape at the periphery of the glass plates, which projects from the end portion of the bending mold (as shown in FIG. 12) at the outer side of the side edge of the glass plates at the peripheral edge portion of the movable split mold portions, which corresponds to the deeply bent portion of the glass plates. Or, such a construction that an edge of the bending mold itself is projected from the end portion, may be used. In the taper ring 140, the contacting surface contacting to the lower surface at the end portion of the glass plates, at the projecting portion of the peripheral portion of the mold, has a shaping surface in agreement with a predetermined shape of the laminated glass. When the glass plates are press-shaped, the end portion of the glass plates is supported so that the end portion is shaped into a predetermined shape. Accordingly, when the two overlapping glass plates are provisionally shaped by their deadweight on the bending mold, only the edge portions of the glass plates 190, 191 are in contact with the supporting surface of the taper ring while the glass plates are supported with a gap between the lower surface of the glass plate 191 and the shaping surface 142 of the taper ring 140, and occurrence of a trace by the bending mold at the position inside from the end portion of the lower surface of the glass plate due to the contact of the shaping surface 142 of the bending mold 112 to the shaping surface 142 of the taper ring 140 at the time of provisionally shaping can be prevented. The pressing operation to the peripheral portion of the glass plates is conducted by an auxiliary pressing member 152, and there is obtainable the peripheral portion of a desired shape which is in correspondence with the shaping surface 142 of the taper ring 140 and the shaping surface 143 of the end portion of the bending mold 112. The taper ring 140 or the projecting portion from a peripheral edge of the bending mold can be provided at a portion necessary to deeply bend the glass plates in the bending mold, and it is not always necessary to provide it in the entire end portion of the bending mold.

Figure 5:
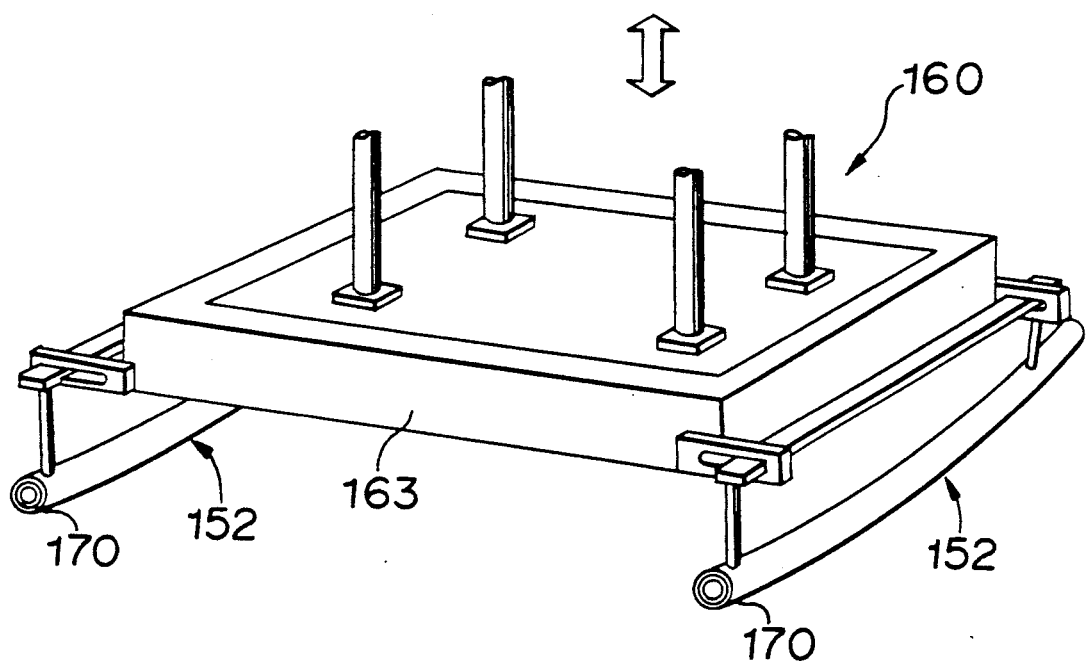
FIGS. 5 and 12 are respectively diagrams showing a part of the auxiliary pressing means for the apparatus for bend-shaping glass plates according to the present invention.

The auxiliary pressing means 160 shown in FIG. 5 is provided with an auxiliary pressing member 152 at a suitable position above the bending mold so as to correspond to the deeply bent portion of the glass plates. The auxiliary pressing member 152 is attached to a pressing table 163 so as to be vertically movable by the action of a pressing cylinder (not shown) wherein when the pressing cylinder is lowered, it press-shapes the deeply bent portion of the glass plates and when the pressing cylinder is raised, the pressing operation is released. When the auxiliary pressing member presses the deeply bent portion of the glass plates, it is preferable to exert a pressing force in the direction perpendicular to the glass plates at its contacting portion between the auxiliary pressing member and the glass plates so that the generation of wrinkles, scars or traces on the glass plates can be reduced.

It is preferable that the auxiliary pressing member is coated with heat insulating cloth 170 made of a material such as glass fibers, silica fibers, ceramic fibers, metallic fibers and so on so as to cover the contacting surface between the auxiliary pressing member and the glass plates in order to prevent a trace by the bending mold from generating on the contacting surface of the glass plates when the pressing operation is conducted.

Figure 6:
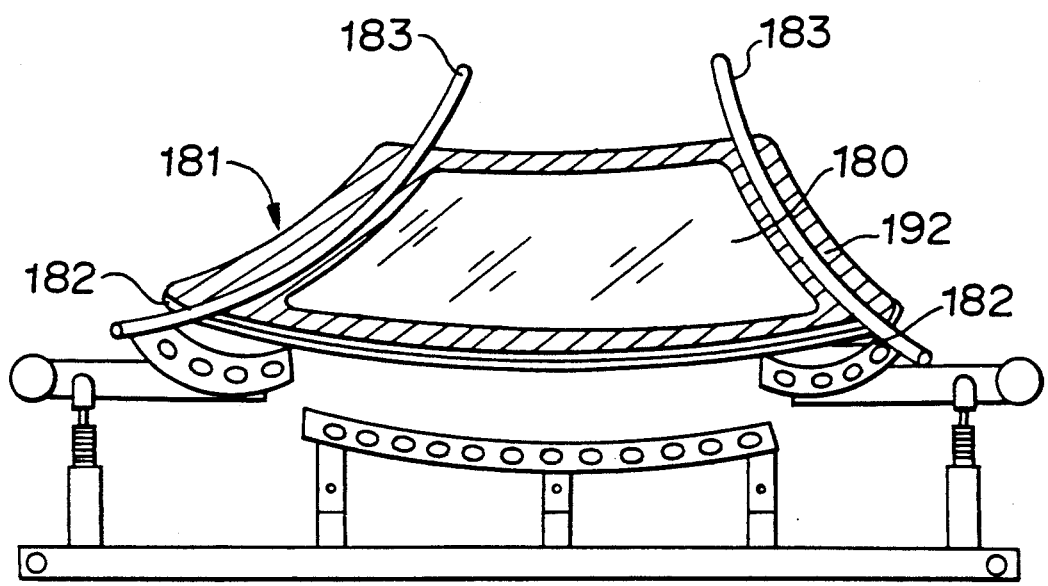
FIGS. 6 to 8 are respectively diagrams illustrating a method of heating locally the glass plates.
Figure 7:
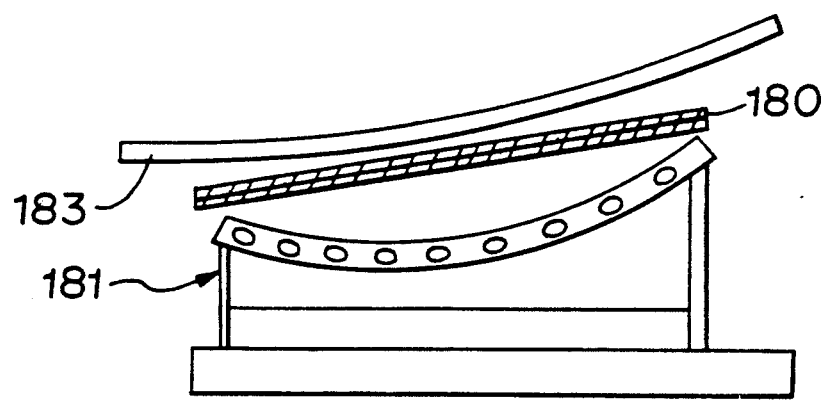
Figure 8:
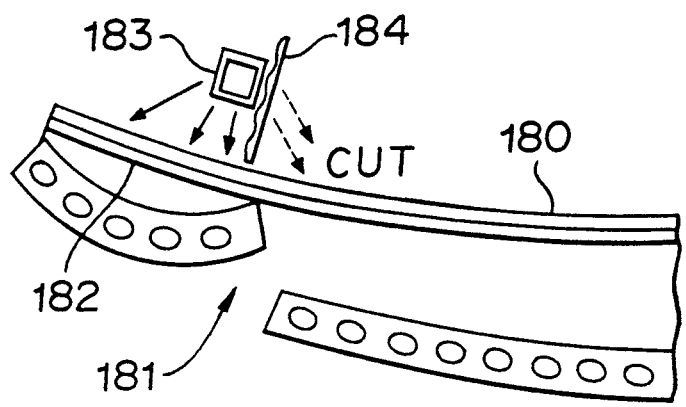

FIGS. 6 through 8 show an example wherein local heating heaters 183 are provided above glass plates 180 at positions corresponding to the deeply bent portion of the glass plates so as to allow easy bending operation to the deeply bent portions 182 of the glass plates 180 when the glass plates 180 are placed on a split type bending mold 181 in a overlapping state and the glass plates 180 are to be bent by their own deadweight on the bending mold. In this case, the deeply bent portions of the glass plates are heated by the locally heating heaters at a temperature of, for instance, 10° C.-100° C. higher than that for the other portions, whereby the bending operation by utilizing the deadweight can be easy. The locally heating heaters may be arranged above or below, or above and below the two overlapping glass plates. The shape of the locally heating heaters is determined depending on the shape of the deeply bent portions of the glass plates, and it may be in a linear form in the longitudinal direction, or in a curved form wherein a line at the deeply bent portion assumes a curved shape. Or, it may have further complicated shape. The example as in FIGS. 6 and 7 illustrates the complicated one.

In a case that it is desired that the locally heating does not influence on the other portion when the glass plates is locally heated by the locally heating heaters, a heat shielding member 184 such as a heat shielding curtain or a heat shielding plate made of a heat resisting material is arranged at a desired position to thereby cut undesired radiation from the locally heating heaters 184 as shown in FIG. 8.

Figure 11:
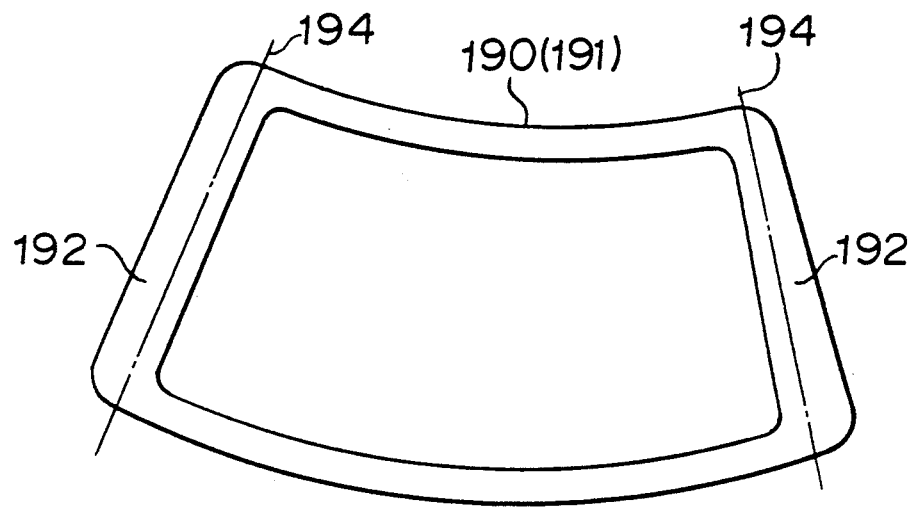

In the method of the present invention, a color-printed ceramic color ink is printed to form a colored zone at a circumferential portion including the press-shaped and deeply bent portion (including folded portions 194) of the glass plates to be bent-shaped as shown in FIG. 11. Since the printed layer is formed by the color-printed ceramic color ink at the portion to be press-shaped and the printed layer is firmly attached by baking on the surface of the glass plates in the heating process before the press-shaping operation, a trace or a flaw resulting from the pressing operation becomes inconspicuous because of the baked colored zone of the color-printed ceramic color ink even when the trace and the flaw is resulted in the colored zone and the circumferential portion of the glass plates. Thus, a drawback in optical sense can be concealed.

Figure 9:
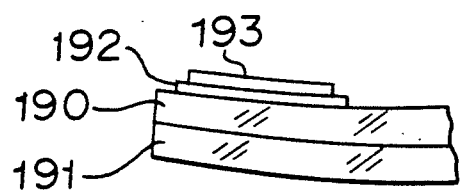
FIGS. 9 to 11 are respectively diagrams showing an embodiment of the method according to the present invention.
Figure 10A:
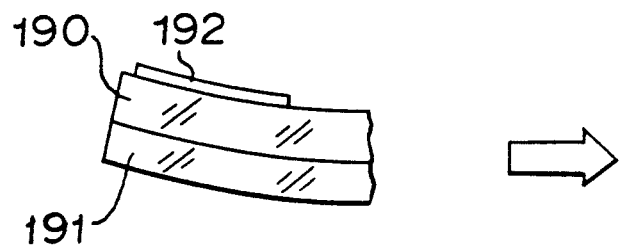
Figure 10B:
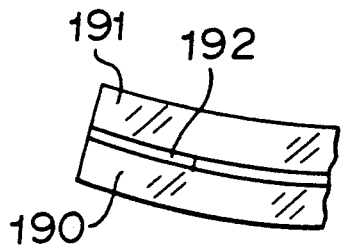

As shown in FIG. 9, in a case that among the two overlapping glass plates 190, 191, a printed layer 192 of the color-printed ceramic color ink is formed on the upper surface of the deeply bent portion of the upper glass plate 190, the printed layer adheres on the heat resisting cloth covering the pressing surface of the auxiliary pressing member to thereby shorten the lifetime of the heat resisting cloth, or to result in a trace of press on the surface where the colored zone of the color-printed ceramic color ink is formed by baking. To eliminate this problem, a layer 193 of a mold release agent having heat resistance is formed by printing on the surface of the printed layer of the color-printed ceramic color ink so that good releasing properties are obtainable between the colored zone formed by baking the color-printed ceramic color ink and the heat resisting cloth of the auxiliary pressing member when the pressing operation is conducted. For the mold release agent having heat resistance, boron nitride or carbon may be preferably used.

Further, in order to improve the lifetime of the heat resisting cloth covering the auxiliary pressing member, or to improve the pressing surface at the colored zone formed by baking the color-printed ceramic color ink, the following measures may be taken. Namely, the two overlapping glass plates 190, 191 are provisionally shaped by utilizing the deadweight; the position of the upper and lower glass plates 190, 191 is upset prior to the press-shaping operation so that the glass plate 190 on which the colored zone 192 is formed by baking the color-printed ceramic color ink is placed below the other glass plate 191. Then, the peripheral portion of the upper glass plate 191 without the colored zone is press-shaped, whereby the colored ceramic color ink is prevented from adhering on the heat resisting cloth.

As described above, in accordance with the method of and apparatus for bend-shaping glass plates, the glass plates for a laminated glass are heated to a glass softening temperature on a split type bending mold comprising a movable split mold portion and a fixed split mold portion to thereby provisionally shape the glass plates into a shape substantially corresponding to the bending mold by utilizing a deadweight bending method. Then, the glass plates are pressed whereby the movable split mold portion is automatically fixed to the fixed split mold portion. Further, an incompletely shaped portion of the glass plates are subjected to locally pressing to thereby regulate the shape of the curved portion of the glass plates. Accordingly, there is no danger of the jumping of a part of the movable split mold portion in the vicinity of the fixed split mold portion at the time of press-shaping even in a case that the degree of deep bending of a side portion of the glass plate is large. Accordingly, the side portion of the glass plates can be certainly deeply bend-shaped and the flexibility in shaping the glass plates can be improved.

We claim:

1. A method of bend-shaping a glass plate, comprising:
   a step of placing a glass plate on a bending mold to form the glass plate with at least one side portion which is deeply bent into a predetermined curved shape, said bending mold comprising a fixed split mold portion having a bend-shaping surface which corresponds to an intermediate curved portion of the glass plate and at least one movable split mold portion which has a bend-shaping surface corresponding to the side portion of the glass plate, said at least one movable split mold portion having a predetermined shape and being placed at a side of said fixed split mold portion with said bend-shaping surface thereof movable around a pivotal shaft for movement into alignment with the bend-shaping surface of said fixed split mold portion,
   a provisional shaping step of heating the glass plate to a temperature capable of bending the glass plate in a heating furnace to thereby cause the glass plate to bend by its own deadweight so as to substantially meet the shaping surface of said bending mold, and
   a press-shaping step of pressing from above by means of an auxiliary pressing member the portion to be deeply bent of said glass plate,
   wherein the pivotal shaft of the bending mold is positioned further from said fixed split mold portion than is said bend-shaping surface of said movable split mold portion, such that a moment of force around the pivotal shaft which acts on the movable split mold portion at the time of press-shaping prevents the bending mold from moving out of alignment during press-shaping.

2. The method of bend-shaping a glass plate according to claim 1, wherein said movable split mold portion is forcibly opened by the application of a force onto the movable split mold portion of the bending mold when the glass plate is placed on the bending mold.

3. An apparatus for bend-shaping a glass plate into a predetermined shape wherein a side portion of the glass plate is deeply bent, which comprises:

a bending mold comprising a fixed split mold portion having a bend-shaping surface which corresponds to an intermediate curved portion of the glass plate, and at least one movable split mold portion which has a bend-shaping surface corresponding to the side portion of the glass plate, said at least one movable split mold portion having a predetermined shape and being plated at a side of said fixed split mold portion with said bend-shaping surface being movable around a pivotal shaft for movement into alignment with the bend-shaping surface of said fixed split mold portion, wherein said pivotal shaft of the bending mold is positioned further from said fixed split mold portion than is said bend-shaping surface of said movable split mold portion, such that a moment of force at the pivotal shaft which acts on the movable split mold portion at the time of press-shaping prevents the bending mold from moving out of alignment during press-shaping, and an auxiliary pressing member positioned vertically movable above the portion of said bending mold where the glass plate to be deeply bent is placed.

4. A bending mold to receive thereon a glass plate and to bend-shape by heating the glass plate into a predetermined shape, which comprises:

a fixed split mold portion having a bend-shaping surface which corresponds to an intermediate curved portion of the glass plate and at least one movable split mold portion which has a bend-shaping surface corresponding to the side portion of the glass plate, said at least one movable split mold portion having a predetermined shape and being placed aside of said fixed split mold portion with said bend-shaping surface being movable around a pivotal shaft for movement into alignment with the bend-shaping surface of said fixed split mold portion, wherein said pivotal shaft is positioned further from said fixed split mold portion than is said bend-shaping surface of said movable split mold portion when the bending mold is viewed from above.

* * * * *